United States Patent
Pfeifer et al.

(10) Patent No.: US 7,533,713 B2
(45) Date of Patent: May 19, 2009

(54) CERAMIC CASTING MOLD FOR CASTING METAL AND PROCESS FOR PRODUCTION THEREOF

(75) Inventors: Rolf Pfeifer, Boeblingen-Dagersheim (DE); Jialin Shen, Bernstadt (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 10/826,582

(22) Filed: Apr. 16, 2004

(65) Prior Publication Data

US 2004/0216860 A1 Nov. 4, 2004

(30) Foreign Application Priority Data

Apr. 16, 2003 (DE) .................. 103 17 473

(51) Int. Cl.
*B22C 9/02* (2006.01)

(52) U.S. Cl. .......................... 164/15; 164/361

(58) Field of Classification Search .......... 164/4.1, 164/456, 15, 519, 361, 369, 332, 333, 363, 164/349

See application file for complete search history.

(56) References Cited

U.S. PATENT DOCUMENTS

| | | | |
|---|---|---|---|
| 3,802,891 A * | 4/1974 | Horton ................. | 106/38.3 |
| 4,334,029 A * | 6/1982 | Naito et al. ........... | 501/109 |
| 4,837,187 A * | 6/1989 | Frank et al. ........... | 501/127 |
| 4,938,802 A * | 7/1990 | Noll et al. ............. | 106/38.9 |
| 4,983,423 A * | 1/1991 | Goldsmith ............. | 427/230 |
| 4,989,667 A * | 2/1991 | Kington ................ | 164/519 |
| 5,147,587 A * | 9/1992 | Marcus et al. ......... | 264/434 |
| 5,204,055 A | 4/1993 | Sachs et al. | |
| 5,677,045 A * | 10/1997 | Nagai et al. .......... | 442/294 |
| 5,807,437 A | 9/1998 | Sachs et al. | |
| 6,036,777 A | 3/2000 | Sachs | |
| 6,155,331 A * | 12/2000 | Langer et al. ......... | 164/456 |
| 6,165,926 A * | 12/2000 | Kriechbaum et al. ... | 501/127 |
| 6,354,362 B1 * | 3/2002 | Smith et al. ........... | 164/332 |
| 6,609,043 B1 * | 8/2003 | Zoia et al. ............. | 700/119 |

FOREIGN PATENT DOCUMENTS

| | | |
|---|---|---|
| DE | 198 09 657 A1 | 9/1999 |
| DE | 100 14 950 C1 | 5/2001 |
| EP | 0 121 929 A3 | 10/1984 |
| EP | 0 431 924 B1 | 1/1996 |
| EP | 0 968 776 A1 | 1/2000 |
| EP | 1 058 675 B1 | 9/2003 |
| WO | 90/03893 | 4/1990 |
| WO | WO 90/33641 A1 | 7/1999 |
| WO | 99/42421 A1 | 8/1999 |
| WO | 00/42471 A1 | 7/2000 |

* cited by examiner

*Primary Examiner*—Kevin P Kerns
(74) *Attorney, Agent, or Firm*—Patent Central LLC; Stephan A. Pendorf

(57) ABSTRACT

Casting mold for metal casting, in particular precision casting of fine parts of steel, in which at least the main part of the casting mold is made of porous ceramic with a high thermal coefficient of expansion which corresponds to the metal, and produced by generative rapid prototyping process, as well as generative rapid prototyping processes and coated powders particularly suitable therefore, as well as uses of the casting mold for tools and their components, in particular of steel.

20 Claims, 1 Drawing Sheet

CERAMIC CASTING MOLD FOR CASTING METAL AND PROCESS FOR PRODUCTION THEREOF

BACKGROUND OF THE INVENTION

1. Field of Invention

The invention concerns casting molds for casting metal, in particular the precision casting of fine parts and processes for production of casting molds which are based on a generative rapid prototyping process, as well as ceramic raw materials particularly suited for this process.

2. Related Art of the Invention

In foundry technology the state of the art in the production of cast parts includes the use of lost wax sand or ceramic molds, which are not reused following casting.

The shaping of casting molds in the case of precision casting, ingot casting or shell casting is generally by a lost wax process or a related processes. Therein first a wax model of the final cast part is produced. The wax model is then coated a number of times with mold sand, which generally involves applying or coating an appropriate ceramic slip. The application of slip is carried out a number of times until the green mold exhibits sufficient shape stability in order to allow melting out of the wax, thereby forming a mold cavity in the casting mold. As a rule, the green casting mold must be fired prior to casting of metal, in order to pyrolyze organic additives (binders in particular) and to solidify the casting mold, turning it into ceramic. The term "turning into ceramic" is to be understood as referring to the firing or sintering of the green mold.

The lost wax process has the disadvantage that the wax model, in the following also referred to as the original model, must be produced by complex and intricate processes. Particularly in the case of producing prototypes various models must be individually constructed of wax. Due to the high thermal coefficient of expansion of wax great tolerance is allowed for dimensional trueness. Also considered disadvantageous therein is the additional process step of melting out the wax which, particularly in the case of relatively large models, translates into a supplemental expenditure in time.

One possibility for entirely dispensing with the manufacture of wax models and at the same time for providing an almost unlimited diversity of individual molds is provided by rapid prototyping processes (RP-process). Processes are known in which ceramic casting molds can be executed directly from computer models using generative RP-processes. Therein the casting molds are built up layer-by-layer with ceramic powder layers, which are built up and solidified, by adhesion or sintering, in selected areas into a three dimensional casting pre-mold. These processes are described in greater detail for example in U.S. Pat. No. 5,204,055. The disadvantage of this process includes that in general a substantially rougher surface is formed than in the case of the lost wax process. Typically, a step-like surface structure is formed, reflecting the thickness of the ceramic powder layers. Further, the complete removal of the residual not bound powder remaining in the inside of the mold leads to problems. This results in a lower surface quality, or to a penetration of the metal casting.

It is proposed in U.S. Pat. No. 6,109,332 to wash the surfaces of the cavities of the casting molds produced by generative RP-processes with solvent, or to flatten the step-like surfaces using a rubbing compound. This process however leads basically also to a removal or, in certain cases, a distortion of the desired precise structure.

A further series of problems is concerned with the dimensional trueness of the casting.

Metallic precision casting is carried out as a rule as a hot casting in which the casting mold is at temperatures of several 100° C. and, as a result of its thermal expansion, assumes a greater volume than in the cold state. After the casting of the metal the ceramic casting mold and the metal cool together from high temperatures to room temperature. As a rule the metal exhibits a substantially higher thermal coefficient of expansion than the ceramic, so that tensions and warping of the foundry casting can occur.

One approach to minimizing tensions and warping is described for example in EP 0 370 751 B1. It is proposed that the metal and ceramic are to be matched as closely as possible with respect to their thermal coefficient of expansion, in that a two-layer casting mold is built up. Therein the inner layer of the casting mold exhibits a higher thermal coefficient of expansion than the outer layer. The inner layer is preferably made of zircon (zirconium silicate) and aluminum oxide flakes. The casting mold is built up by coating wax models (lost wax process). This constructed geometric arrangement of the two layers is not producible by the known generative RP-process. Besides this, the zircon, at $4.5*10^{-6}K^{-1}$, exhibits a relatively low thermal coefficient of expansion. The forestalling or retarding of the shrinkage of the cast metal, in particular mold cores, remains as before.

A further substantial influence on dimensional precision is inherent in the firing of the green casting mold. Firing leads to a reduction in volume of the casting mold. Only for the simplest of molds can this shrinkage be pre-calculated and compensated for by appropriate over-dimensioning of the original model.

SUMMARY OF THE INVENTION

It is thus the task of the present invention to provide a casting mold for metal casting, in particular precision casting, which provides a high surface quality and improves the dimensional trueness of the cast parts, as well as to provide a process and raw materials therefore, with which the casting molds can be produced in simple manner, in particular without the aid of original wax shapes.

The task is solved in that the casting mold for the metallic precision casting of fine parts is comprised at least substantially of a porous ceramic in the green or sintered state, of which the thermal coefficient of expansion is greater than 7.5 µm/mK ($7.5*10^{-6}K^{-1}$), wherein the casting mold is produced by a generative rapid prototyping process, preferably employing powder mixtures of coated coarse particles and fine powder.

In accordance with the invention the casting mold is partially or entirely, at least however in substantial proportion, comprised of a porous ceramic with a high thermal coefficient of expansion. Thereby the difference between the thermal coefficient of expansion between the cast metal and casting mold is kept small and the thermal tensions following casting are substantially reduced. In particular, the incidences of warping or abnormal shrinkages brought about by the geometric shape of the casting mold is substantially reduced. The dimensional trueness of the casting is thereby substantially improved. The range of preferred thermal coefficient of expansion (TCE) of the ceramic depends upon the corresponding cast metal. For steel the TCE is preferably above $7.5*10^{-6}K^{-1}$ and particularly preferably in the range of 8.5 to $12*10^{-6}K^{-1}$.

In particular in the field of precision casting structures, cutbacks and mold cores, having the TCE matched to the casting metal is of particular advantage. Thus, in the case that the casting mold is only in part made of the ceramic with high TCE, it is intended or provided that at least the precision mold structures and/or in certain cases the existing mold cores are produced of this ceramic. The term "mold cores" is in this context also intended to include all casting mold structures in which the casting metal is circumfluent over the major portion of their surface.

Suitable materials for casting molds include carbide, nitride and oxide ceramics, of which the TCE is above approximately $7.5*10^{-6}K^{-1}$. Particularly preferred are thus the oxide ceramics based on the elements Zr, Al, Mg. Particularly preferred are zircon partially stabilized with Ce, Mg or Y, Al/Zr-oxide, spinel and magnesium silicate.

Besides these main components, the oxide ceramic in accordance with the invention contains binder phases, which with respect to their sintering temperatures clearly differ from the main components of the casting mold. These binder phases are typically based on $SiO_2$ or silicates. The sintering temperature of the binder phases is preferably at least 50°C. below that of the remaining components. The temperature differential of the sintering temperatures is particularly preferably greater than approximately 100°C.

The strength or stability of the ceramic casting molds is thereby substantially determined by the proportion and the type of the binder phases, and establishes itself by the ceramic firing of the green mold or during heating of the green mold to the casting temperature.

In accordance with the invention the content of binder phases is reduced to the extent that no follow-up sintering of the ceramic casting molds during ceramic firing can occur, or as the case may be, no significant sintering shrinkage any longer occurs. It is particularly preferred that no significant sintering shrinkage occurs at temperatures below the casting temperature. The proportion of binder phases is thus limited to a few wt. % and typically lies below 7 wt. %.

The porosity of the ceramic casting molds is equivalent to the general range for ceramic casting molds as known from the state of the art.

The usual manner of proceeding for production of the ceramic casting molds does not involve ceramic firing.

A further inventive embodiment envisions, in contrast thereto, that the casting mold is constructed at least in part of green ceramic (green mold). For example, the main proportion of the casting mold can be ceramic and a core or incorporated parts or inlays or inserts can be present in the green state. The green parts of the mold thus still contain, at least prior to heating of the casting mold to casting temperatures, some organic binders. The proportion of organic binders is generally in the range of 1 to 10 wt. %. Therein carbonizing organic binders, that is, binders which during pyrolysis form a high carbon residue, are preferred. The organic binders are partially or completely pyrolyzed during heating depending upon the temperature and time of heating. A high proportion of organic binders could in preferred manner increase the porosity of the casting mold.

The dispensing with the separate step of ceramic firing of the green casting molds provides a further important process advantage.

The inventive casting molds are in particular suited for the precision casting of metal alloys or refractory alloys with an average thermal coefficient of expansion in the range of 5 to $14*10^{-6}K^{-1}$ (average value over temperature interval 0 to 800° C.).

Among the metal alloys which cooperate particularly well with the inventive casting molds are steels, ferritic, martensitic steels, Fe/Ni—, Fe/Ni/Co— or Ni-alloys.

Included in the particularly preferred steels are, in particular, the acid resistant steels with steel code numbers 1.4059, 1.4085, 1.4086, 1.4136, 1.4138 with a thermal coefficient of expansion of approximately $11.5*10^{-6}K^{-1}$, and the particularly heat resistant steels 1.4710, 1.4729, 1.4740, 1.4743 with a thermal coefficient of expansion of approximately $13.5*10^{-6}K^{-1}$. (The numbers are with reference to the "Steel Codes", publishing house Steel Codes GmbH, Marbach, 2001 Edition).

The cast parts can be employed for example as parts of mold or shaping tools or as prototypes and for small run production in automobile construction.

In accordance with the invention it is provided or intended that the casting molds, or at least their essential parts, are produced by generative rapid prototyping process (RP).

The term generative RP is intended to include processes which include at least the following essential shaping steps:
a) applying a layer of particles (powder layer) onto a substrate;
b) flattening the applied layer with a flattening device;
c) hardening the applied layer in defined areas
   by adhering the particles under the influence of binder liquid,
   or by melting or sintering the particles under the influence of intensive electromagnetic radiation, in particular laser radiation,
   or adhering the applied layer by light induced hardening of organic binders.

By repeating steps a) through c) a number of times the green shape is built up by successive layers.

In accordance with the invention it is provided that the powder particles are comprised of ceramic material with an average thermal coefficient of expansion above $7.5*10^{-6}K^{-1}$.

A further aspect of the invention is concerned with ceramic powder mixtures particularly suited for the process.

In one advantageous embodiment of the invention powder mixtures of coarse material and fine material are employed, wherein the fine material has a significantly higher sinterability than the coarse material. The sintering temperature of the fine particles lies in accordance with the invention at least 50° C. below that of the coarse particles. By this combination of sinterable fine material and less sinterable coarse material a limiting of the sintering shrinking is achieved during ceramic firing of the green casting mold. The sintering is essentially confined to the fine particles which form the binder phase.

The inventive powder composition is an important contributor to the dimensional stability or trueness of the casting.

The fine material is also referred to herein as ceramic binder, which in the ceramic form is the binder phase. The coarse material is particularly comprised of the already discussed oxide ceramics based on Al, Zr and/or Mg, while the fine material or the ceramic binder is based on $SiO_2$ and/or silicates.

In accordance with the invention there is a clear particle size difference between coarse and fine material. With regard to the particle size distribution there is thus a clear particle size gap. Typically the average particle size of the coarse particle is above 10 μm and the average particle size of the fine particles is below 5 μm. Therein the average particle size of the large material should be at least the 10 fold of the average particle size of the fine material. It is particularly preferred when the fine particle is nano-powder, for example pyrogenic $SiO_2$ or aluminum oxide.

The coarse material could just as well be agglomerations of smaller particles. Therein agglomerates of particles with an average diameter range of approximately 1 to 5 μm are found particularly preferable.

A further embodiment of the invention envisions that the powder employed for generative RP-process is comprised primarily of coated particles. Therein at least the coarse particles are provided with a coating. The fine particles may be present as the second, generally uncoated, powder component. Preferably the fine particles are however bound in or onto the coating. If nano-particles are employed, these are typically a component of the coating of the coarse particles.

A further aspect of the invention is concerned with the preferred shaping process involving generative RP.

In a preferred process embodiment of generative RP, a 3D-binder printing process is employed. The solidification of the particle layers is therein brought about by the influence of binder liquid, which is applied to the layer by means of a liquid dispensing printer head. The adhesive effect can be caused by components of the binder liquid or by components in the powder, of which the adhesive effect is activated by the influence of the liquid.

Preferably employed herein is the combination of coated powders, of which the coating includes polymers which are readily soluble in organic solvents and binder liquids comprising organic solvents. The polymers suitable for the invention include in particular poly(meth)acrylate, polyvinyl alcohol, polyvinyl acetate, polyvinyl pyrolidone, or polyvinyl butyral, exclusively or as mixtures. The binder liquids suitable for the invention include in particular mixtures which contain the C2- through C7-alcohols, for example ethyl alcohol, (iso)propanol or n-butanol, C3- through C8-ketones such as for example acetone or ethyl-methyl-ketone, cyclic ethers such as tetrahydrofuran, or polyethers such as dimethoxyethanol or dimethoxydiethylene glycol. In the case of the use of wax-type coatings, low molecular aliphatic carbohydrates, in particular cyclic or linear C6- through C8-aliphatics, are preferred.

In a further preferred process embodiment, laser sintering is employed. The solidification of the particle layers is herein caused by melting or sintering of the particles to each other. The melting and sintering can be limited to only certain components of the powder mixture. This is, for example, the case when the powder mixture is comprised of ceramic and polymer particles, wherein then only the polymer particles are melted or sintered.

In yet a further variation of the inventive process, polymer coated ceramic powder particles are employed. Therein the laser output is so adjusted that essentially only a melting and/or sintering of the polymer component occurs; a ceramic sintering process is however precluded. As polymers there are employed thermoplastics, for example poly(meth)acrylate or a duroplastic such as, for example, phenol resin. In the case of the duroplastic under the influence of the laser radiation a carbonization of the material is caused, whereby a solidified carbonaceous residue is formed. The polymers are particularly preferably a component of coated ceramic particles.

The already discussed powder mixtures of coarse and fine components can also be employed in the laser sintering process in analogous manner.

A further aspect of the invention is concerned with the construction of the casting mold.

BRIEF DESCRIPTION OF THE DRAWINGS

Advantageous embodiments of the invention are described in greater detail in the following on the basis of the figures. The figures are only exemplary and serve for explanation of the invention. In the invention is not limited to the described embodiments of the invention.

Therein there is shown.

DETAILED DESCRIPTION OF THE INVENTION

Although the generative RP-processes are particularly suitable for the integral production of even complex casting mold geometries, it is not outside the scope of the invention that the casting mold contain additional parts, for example, support or reinforcing or coating or casing parts (in the following also referred to as mold shell), which are produced by another process.

Figure 3:
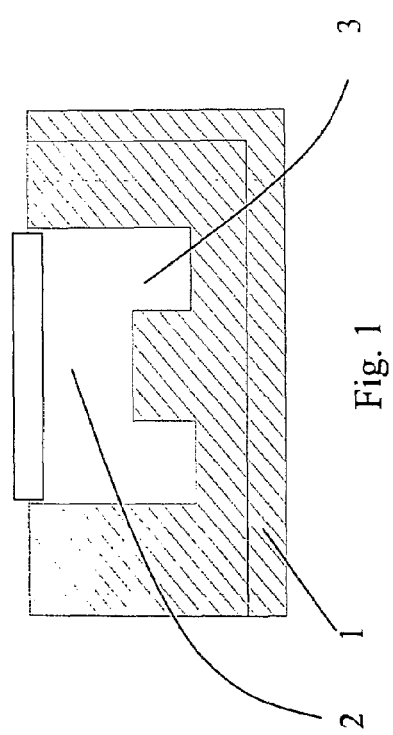
FIG. 3 Cross-section of an assembled casting mold with mold cavity (2), with a shell (6) of mold sand and an insert (7) produced by a generative RP-process, exhibiting a geometric receiving volume area (3)

In accordance with the invention the mold insert (7), in particular the mold part with the highest geometric requirements, is produced by generative RP-processes (see FIG. 3). The shell (6) or, as the case may be, the reinforcing or casing part of the assembled casting mold, is preferably formed by more economical mold sand, for example quartz sand or zircon sand. The reduced dimensional trueness and casting surface quality in the area of the reinforcing and casing structures can generally be accepted without problem, since the highest quality requirements in the cast parts are as a rule limited to only selected geometrically sophisticated or exacting areas (3), while over large areas in part greatly reduced requirements exist or resort may be had to a very simple follow-up processing.

This can be of advantage in particular in the case of comparatively smaller geometric exacting areas (3). Also for simple mold core geometries, or if a different material is to be employed for the mold core, this aggregated process is useful.

In a further variant neither casting molds nor cores nor inserts are fired, but rather submitted to the casting process while in the green state. The green part is formed in particular by polymer-bound ceramic powder based on $ZrO_2$ and/or $Al_2O_3$, in certain cases with ceramic binders.

Figure 1:
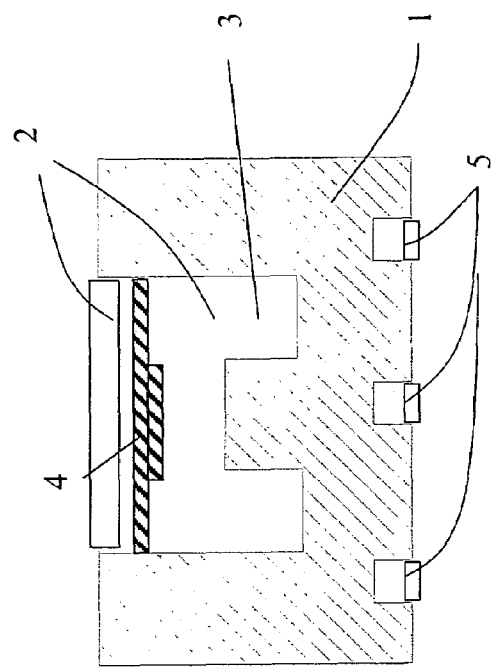
FIG. 1 Cross-section of a casting mold produced by a generative RP-process comprised of porous ceramic (1), mold cavity (2) and geometric receiving volume area (3)
Figure 2:
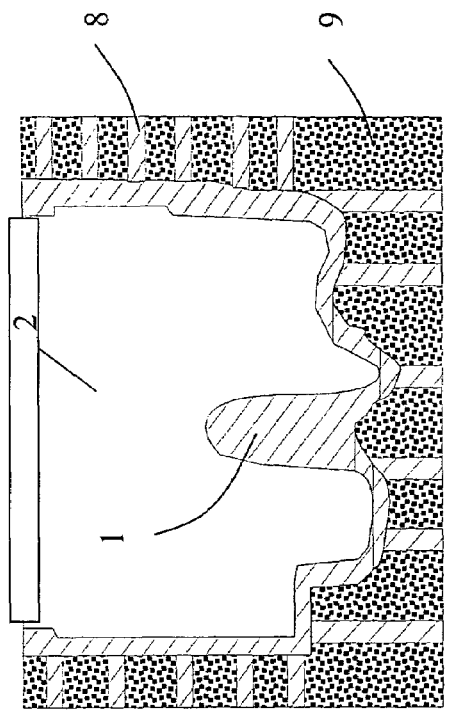
FIG. 2 Cross-section of a casting mold produced by means of a generative RP-process, comprised of porous ceramic (1), with mold cavity (2), geometric receiving volume area (3), mold core (4) and ribs (5)

FIG. 2 shows the inventive variant of an assembled casting mold, wherein the casting mold (1) is comprised of green or fired ceramic as the mold shell and a mold core (4) extending through the mold cavity (2) in the form of green or fired ceramic. The mold core (4) defines for example cooling channels or securing channels of the cast object.

Preferably, the structures corresponding to the mold core (according to (4), FIG. 2) in certain cases the structures which are flowed-about to a great extent by the casting metal, are likewise produced by generative RP. It is particularly preferred when the entire casting mold is formed integrally in a single generative RP-process.

By the generative RP-process it is likewise possible in simple manner to precisely produce the exterior shape of the casting mold. For example it is possible to provide cooling channels on or in the outside of the casting mold, or flow gates or risers. FIG. 2 shows an example of an embodiment with exterior ribs (5) which have the effect of cooling channels.

Figure 4:
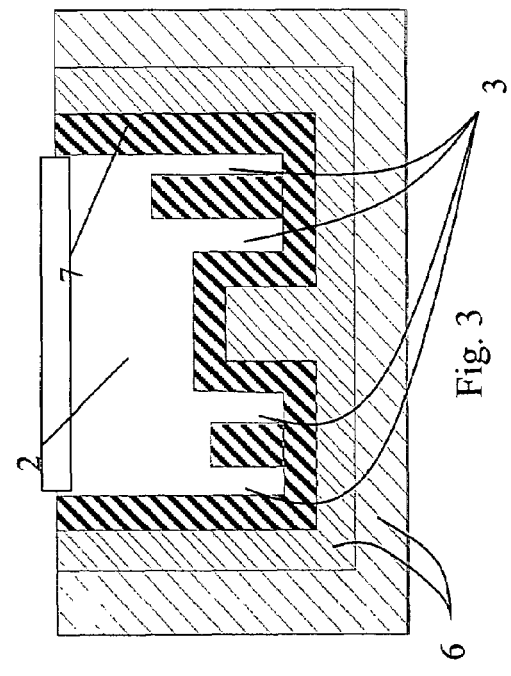
FIG. 4 Cross-section of a casting mold of porous ceramic (1) with supporting ribs (8) and a back fill (9) of loose ceramic

In FIG. 4 a further embodiment of the invention is shown. This shows a cross-section through a casting mold of porous ceramic (1), which carries supporting ribs (8) on the side opposite to the mold cavity (2). The casting mold is back-fed with loose ceramic (9) for the casting or pouring of the metal. The fill provides the comparatively thin casting mold produced by generative 3D-PR-process with the mechanical stability necessary for casting. The fill is comprised preferably of mold sand or refractory sand based on SiO$_2$, silicates or zirconium.

In the simplest case the entire casting mold is formed integrally by means of generative RP and exhibits no mold core.

A preferred use of the inventive casting molds is in the production of tools, in particular in the manufacture of die casting tools.

The invention claimed is:

1. A process for producing a casting mold for metallic foundry or for precision casting of fine metal parts, wherein the casting mold, or at least a part thereof, is produced by a generative rapid prototyping process, said process comprising:
   a) forming a layer of a mixture of ceramic coarse particles and sinterable ceramic fine particles, wherein the average particle diameter of the coarse particles is above 10 μm, the average particle diameter of the ceramic fine particles is below 5 μm, and the average particle diameter of the ceramic coarse particles is at least 10 fold of the average particle diameter of the ceramic fine particles,
   b) melting or sintering the ceramic fine particle under the influence of intensive radiation without substantially melting the ceramic coarse particles such that the fine particles form bridges binding the coarse particles, and
   c) repeating steps a) and b) to form successive layers until a casting mold, or at least a part thereof, comprised of a porous ceramic in the sintered state is formed,
   wherein the thermal coefficient of expansion of the thus produced ceramic casting mold or part is above approximately 8.5*10$^{-6}$K$^{-1}$.

2. The process as in claim 1, wherein said intensive radiation is laser radiation.

3. The process as in claim 1, wherein the fine particles and coarse particles are the same material.

4. The process as in claim 1, wherein the coarse particles are oxide ceramics based on Al, Zr, and/or Mg, while the fine ceramic particles are based on SiO$_2$ and/or silicates.

5. The process as in claim 1, wherein said coarse particles are coated with an organic binder, and wherein fine particles are incorporated in said organic binder.

6. The process as in claim 5, wherein the proportion of binder phase to ceramic phase is 7% or less.

7. The process as in claim 1, wherein the sintering temperature of the fine particles is at least 50° C. below that of the coarse particles.

8. The process according to claim 1, wherein the casting mold includes reinforcing ribs produced using a generative rapid prototyping process.

9. The process for according to claim 1, wherein, at least during casting, the casting mold is back-fed with a fill of ceramic material.

10. A process for producing a casting mold for metallic foundry or for precision casting of fine metal parts,
    wherein the casting mold, or at least a part thereof, is produced by a 3D binder printing process comprising
    a) forming a layer of a mixture of ceramic coarse particles coated with a binder and ceramic fine particles,
    b) dissolving or melting the binder in areas corresponding to the casting mold, or part thereof, so as to cause said coated particles in said areas to adhere,
    c) repeating steps a) and b) to form successive layers until a green casting mold, or part thereof, is formed,
    d) sintering said green casting mold, or part thereof, to sinter the fine particles without substantially melting the coarse particles such that the fine particles form bridges between the coarse particles, such that said mold or part thereof is comprised of a porous ceramic in the sintered state, and wherein the thermal coefficient of expansion of the ceramic mold is above approximately 8.5*10$^{-6}$ K$^{-1}$.

11. The process according to claim 10, wherein the green casting mold includes 0.5 to 10 wt. % organic binder.

12. The process according to claim 10, wherein the proportion of binder phase to ceramic phase is 7% or less.

13. The process according to claim 10, wherein the average particle diameter of the coarse particles is above 10 μm, the average particle diameter of the fine particles is below 5 μm, and the average particle diameter of the coarse particles is at least 10 fold of the average particle diameter of the fine particles.

14. The process according to claim 10, wherein said fine particles are incorporated in the binder coating the coarse particles.

15. The process according to claim 10, wherein the fine particles and coarse particles are the same material.

16. The process according to claim 10, wherein the sintering temperature of the fine particles is at least 50° C. below that of the coarse particles.

17. The process according to claim 10, wherein the ceramic mold includes as a main component aluminum oxide, zirconium oxide, magnesium silicate, spinel and/or magnesium oxide.

18. The process according to claim 10, wherein the binder coating the coarse particles is an organic polymer.

19. The process according to claim 18, wherein the organic polymer is readily soluble in organic solvent.

20. The process according to claim 16, wherein the ceramic coarse particles include oxides of the elements Mg, Al, and/or Zr, and the ceramic fine particles are comprised essentially of SiO$_2$ and/or silicates.

* * * * *